(12) United States Patent
Keating et al.

(10) Patent No.: US 7,499,402 B2
(45) Date of Patent: Mar. 3, 2009

(54) NETWORK DELAY CONTROL

(75) Inventors: Pierce Keating, Issaquah, WA (US);
Yan Zhang, Bothell, WA (US); Bill Stevens, Bellevue, WA (US)

(73) Assignee: RadioFrame Networks, Inc., Redmond, WA (US)

( * ) Notice: Subject to any disclaimer, the term of this patent is extended or adjusted under 35 U.S.C. 154(b) by 671 days.

(21) Appl. No.: 11/054,345

(22) Filed: Feb. 8, 2005

(65) Prior Publication Data

US 2005/0226156 A1 Oct. 13, 2005

Related U.S. Application Data

(60) Provisional application No. 60/562,111, filed on Apr. 13, 2004.

(51) Int. Cl.
*H04L 12/26* (2006.01)
(52) U.S. Cl. ....................... 370/235; 370/412
(58) Field of Classification Search ................ 370/414, 370/395.1, 338, 235
See application file for complete search history.

(56) References Cited

U.S. PATENT DOCUMENTS

| | | | |
|---|---|---|---|
| 6,097,697 A | 8/2000 | Yao et al. | |
| 6,188,698 B1 | 2/2001 | Galand et al. | |
| 7,225,271 B1 | 5/2007 | DiBiasio et al. | |
| 7,366,175 B2 * | 4/2008 | Stacey et al. | 370/395.1 |
| 7,385,997 B2 * | 6/2008 | Gorti et al. | 370/415 |
| 2003/0142625 A1 | 7/2003 | Wan et al. | |
| 2004/0151150 A1 * | 8/2004 | Kubler et al. | 370/338 |

* cited by examiner

*Primary Examiner*—Chi H Pham
*Assistant Examiner*—Albert T Chou
(74) *Attorney, Agent, or Firm*—Van Pelt, Yi & James LLP

(57) ABSTRACT

Controlling the flow of network traffic to avoid undesired delay in the transmission of timing sensitive packets is disclosed. A plurality of packets to be transmitted via a network transmission path is monitored. A time at which a timing sensitive packet will become available for transmission via the network transmission path is anticipated. The plurality of packets is controlled in light of the anticipated time so that packets other than the timing sensitive packet will not occupy the network transmission path at a time associated with the anticipated time. Approximating a maximum data transmission rate associated with a network transmission path by sending and analyzing receipt of a series of test packets is disclosed. Approximating a buffer size of a buffer associated with a network transmission path by sending and analyzing receipt of a series of test packets is disclosed.

51 Claims, 17 Drawing Sheets

NETWORK DELAY CONTROL

CROSS REFERENCE TO OTHER APPLICATIONS

This application claims priority to Provisional U.S. Patent Application No. 60/562,111, entitled Network Flow Control, filed Apr. 13, 2004, which is incorporated herein by reference.

FIELD OF THE INVENTION

The present invention relates generally to networking. More specifically, a delay control technique is disclosed.

BACKGROUND OF THE INVENTION

In computer networks, packets transferred from one network node to the next may experience varying delays. Generally speaking, packets are typically sequenced and transmitted one at a time through the network path. When multiple packets are to be transmitted through a network, the subsequent negotiation and sequencing can lead to random amounts of transmission delays. For example, a packet may be forced to wait for another packet to complete transmission because the other packet began transmission before the waiting packet became available, or because the other packet has a higher priority designation. As a result, the delay in the arrival of the packet may deviate from the expected transmission delay. The deviation from the expected delay is commonly referred to as jitter. For many network configurations the jitter has a probability distribution function (pdf) which is not a normal distribution. Further, the jitter is a non-stationary stochastic process.

Jitter in the network is particularly undesirable for time sensitive packets such as timing packets, voice over Internet Protocol (IP), video streaming, or other packets of protocols with relatively strict timing requirements. Jitter may lead to significant performance degradation and decrease in the utilization of network bandwidth. Also, for packets which include timing and frequency information, the non-stationary nature of the network jitter makes the reliable propagation of such information difficult. Consequently, it would be desirable to have a way to reduce jitter for packets that are time sensitive. It would also be useful if the utilization of the network bandwidth can also be increased. Further, it would be useful if the network jitter could be made a stationary stochastic process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Improving the transport performance of a packet-based network, such as Ethernet, asynchronous transfer mode (ATM), packet relay, etc., with respect to delay characteristics is disclosed. In some embodiments, the average propagation delay of designated packets through a packet-based network and the propagation delay variation of a series of corresponding designated packets are reduced or minimized. As used herein, the term "timing sensitive packet" is used to refer to a packet with respect to which it may be advantageous or desirable to reduce, minimize, or avoid propagation delay. An example of such a packet may be a timing packet used to synchronize two or more processes or operations, e.g., at two different locations. Such a timing packet might be used to provide a phase or frequency reference through a network in order to lock a phase-locked loop (PLL) or frequency-locked loop (FLL) at a remote location.

As used herein, a packet refers to a unit of data transmitted via a network, such as Ethernet packets, data cells, or other data units according to various protocols and standards. The format of the packet and the amount of data stored in a packet may vary. For purposes of illustration, examples using Ethernet packets are discussed extensively throughout this specification, although the techniques are applicable to other packet types as well.

Figure 1:
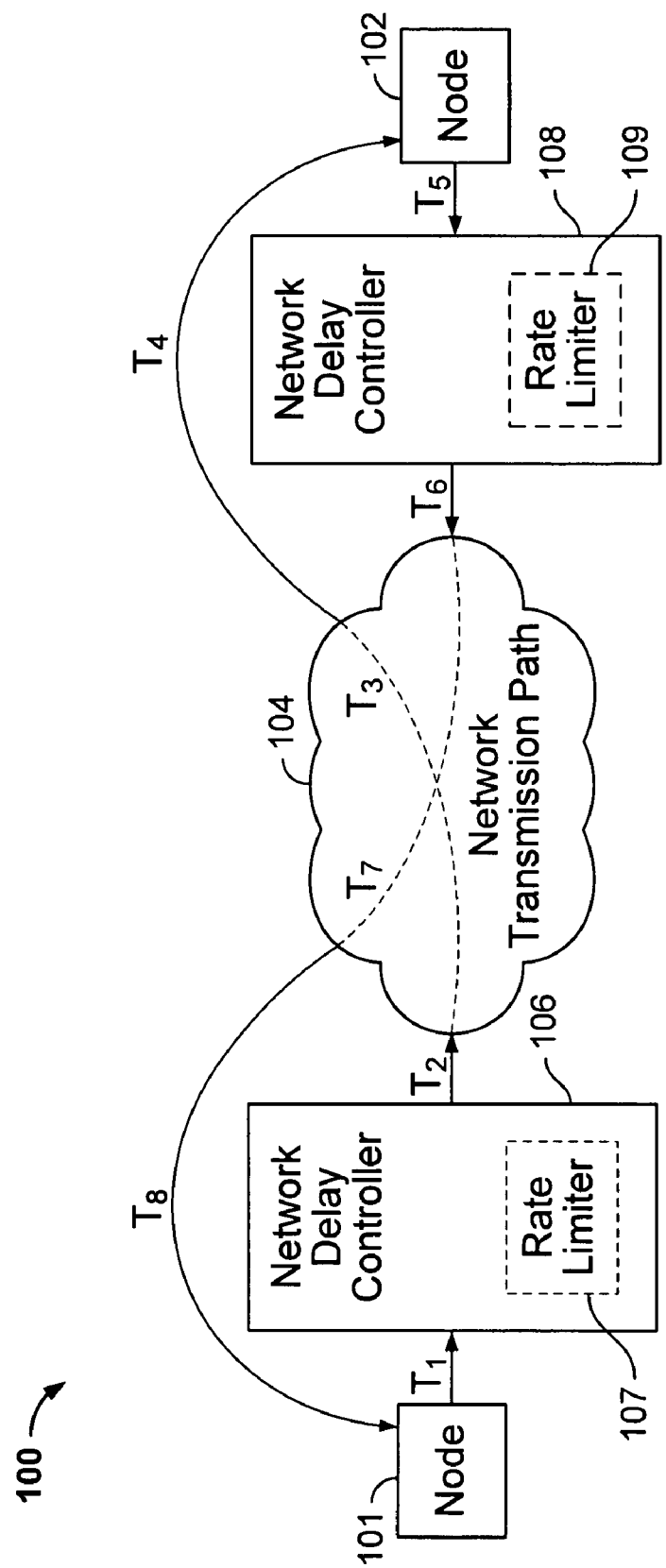
FIG. 1 illustrates a network delay controller used in one embodiment.

FIG. 1 illustrates a network delay controller used in one embodiment. In this example, a first node (101) transmits information packets to a second node (102) through a network transmission path (104). Nodes 101 and 102 may comprise embedded systems, computer terminals or ingress/egress points for associated networks or network elements. A network delay controller (NDC) (106) is used to transfer packets between node (101) and a network transmission path (NTP) (104). Substantially all information packets received by the second node (102) are sent through the NDC (106). In FIG. 1, the maximum data transmission rate from the first node (101) to the NDC (106) is designated by T1. The maximum data rate from the NDC (106) to the network transmission path (104) is designated by T2. The maximum data rate of the network transmission path (104) from a port coupled to the NDC (106) to a port coupled to the second node (102) is designated by T3. In this example, it is assumed that the maximum data rate T3 is less than the maximum data rate either T1 or T2. The problems associated with this situation are referred to herein as "rate transition jitter," whereby the arrival time of timing sensitive packets that the receiving end may be difficult to predict reliably due at least in part to the fact that different segments of the end-to-end path the timing sensitive packets must traverse may have different data rates. The assumption that the maximum data rate T3 is less than the maximum data rate either T1 or T2 implies that the first node (101) has a network interface that has a higher transmission bandwidth than the network transmission path (104) itself. Consequently, the first node (101) is capable of data transmission at a faster rate than the NTP (104). An example of such a network transmission path may include a digital subscriber line (DSL) transmission path. A DSL modem may have a "10 base T" Ethernet interface to a computer, for example, which is capable of transmitting 10 million bits per second (Mbps). The DSL connection itself may have a maximum transmission capacity of 1 Mbps. In order to operate with a relatively high-speed transmitter, such as the first node (101), the NTP (104) includes storage for a data packet as it is received from the transmitter in a complete burst and is relatively slowly propagated through the NTP (104). The NTP (104) may include additional storage for a rapid, though limited, burst of packets as they are received from the first node (101). The NTP (104) may include a combination of commonly known network elements such as switches, routers, fiber optic media, analog subscriber lines, etc.

Included in the set of packet types transmitted by the first node (101) to the second node (102) are designated timing sensitive packets. The timing sensitive packets are distinguished from other packets by one or more particular fields within the packet structure. For Ethernet protocol, the "Ethernet Type Field", which is the 16 bits following the 48 bit source and destination address fields, may be used. Alternatively, the 48 bit destination address field or a subset of the destination address field, a portion of the source address field, the payload, a combination of various fields within the packet, or any other appropriate field(s) may be used. Factors such as the particular application, the configuration of the system, overall efficiency, the network protocol and the network medium may influence the selection of the field used to distinguish timing sensitive packets. Packets received by the NDC (106) are monitored for the presence of designated time sensitive packets.

In FIG. 1, the NDC (106) includes a rate limiter (107) used to limit the data rate as packets are received from the first node (101), such that the transmission of packets to the NTP (104) is throttled in accordance with the maximum data rate of the NTP (104). In order to limit the data rate of packets forwarded to the network transmission path (104), the NDC may store some packets received from the first node (101). If a non-timing sensitive packet is received and no storage is available or if an insufficient amount of storage is unoccupied, and if the packet cannot be forwarded to the network transmission path (104) without substantially exceeding the data rate capacity of the NTP (104), then the packet is discarded. Preferably, all timing sensitive packets are forwarded to the NTP (164) when they are received by the NDC (106). Because data is rate-limited by the NDC (106) in accordance with the maximum data rate of the network transmission path (104), the network transmission path (104) will not typically have more than a maximum-sized packet in storage, depending on the particular rate-limiting technique used in the NDC (106).

Figure 2A:
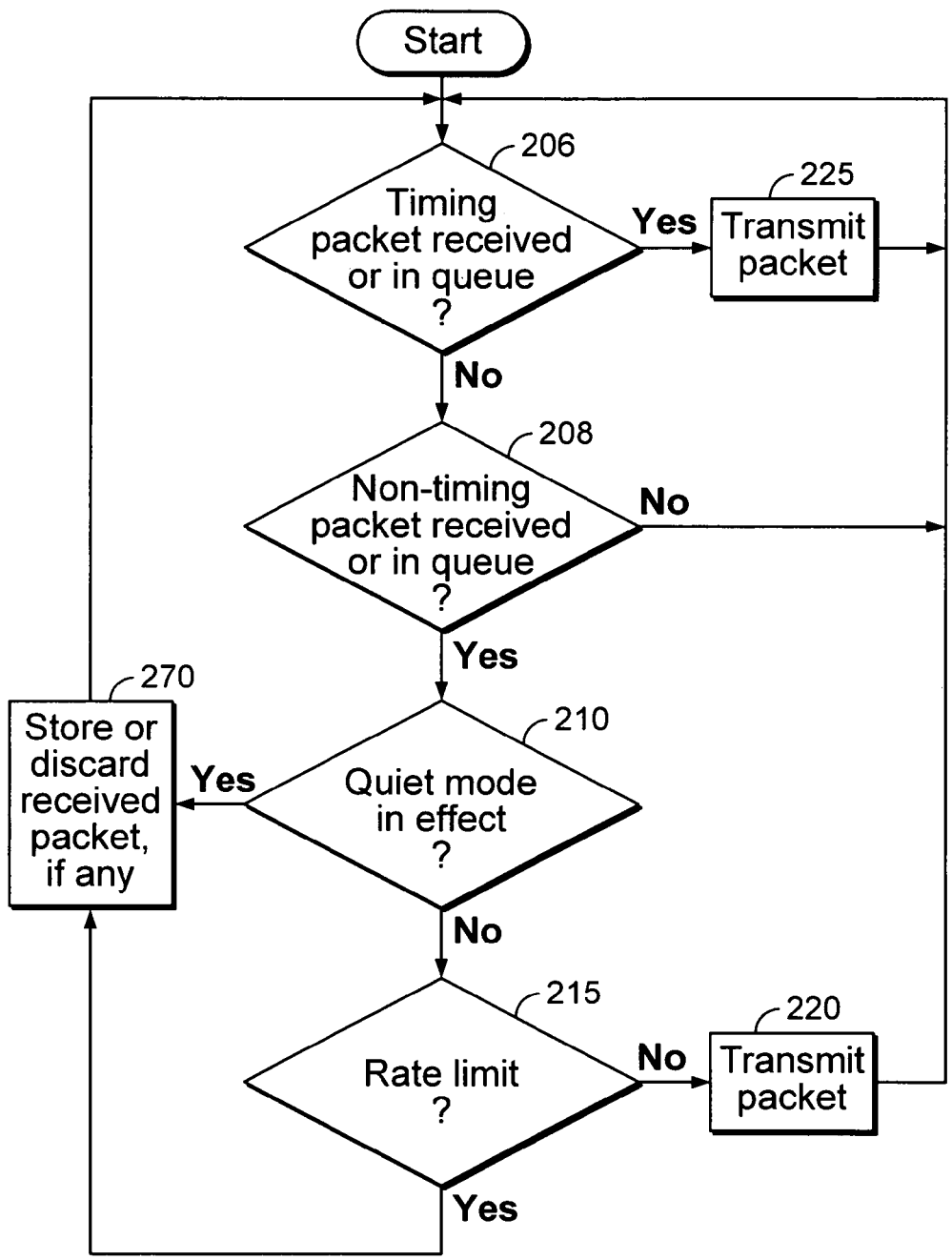
FIG. 2A illustrates a packet handling process implemented by the NDC.
Figure 2B:
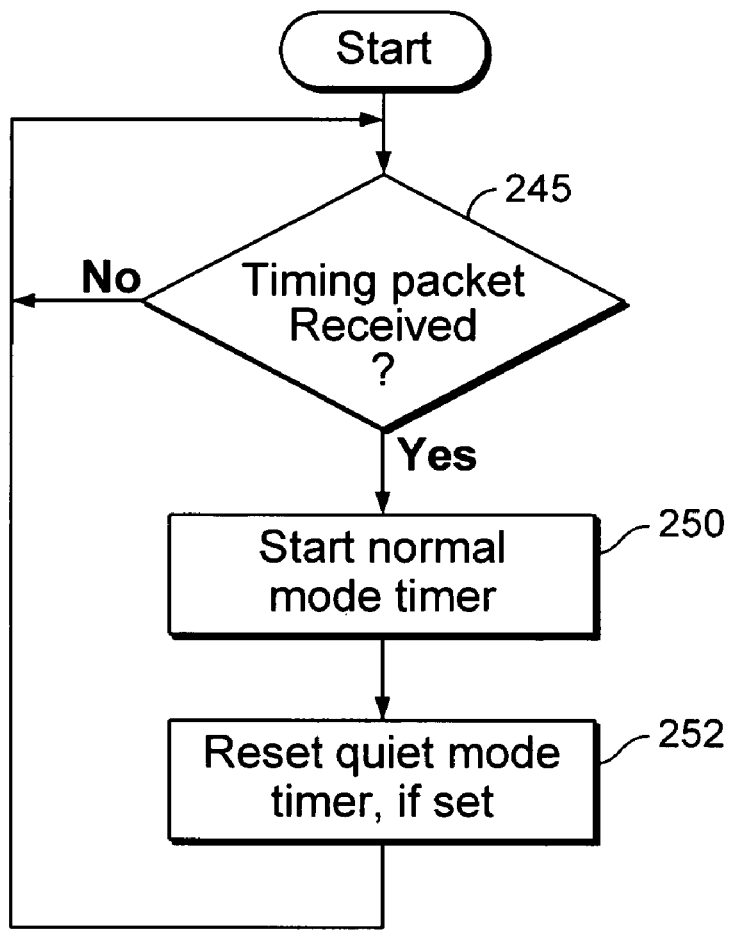
FIG. 2B shows processes for a normal mode timer.
Figure 2C:
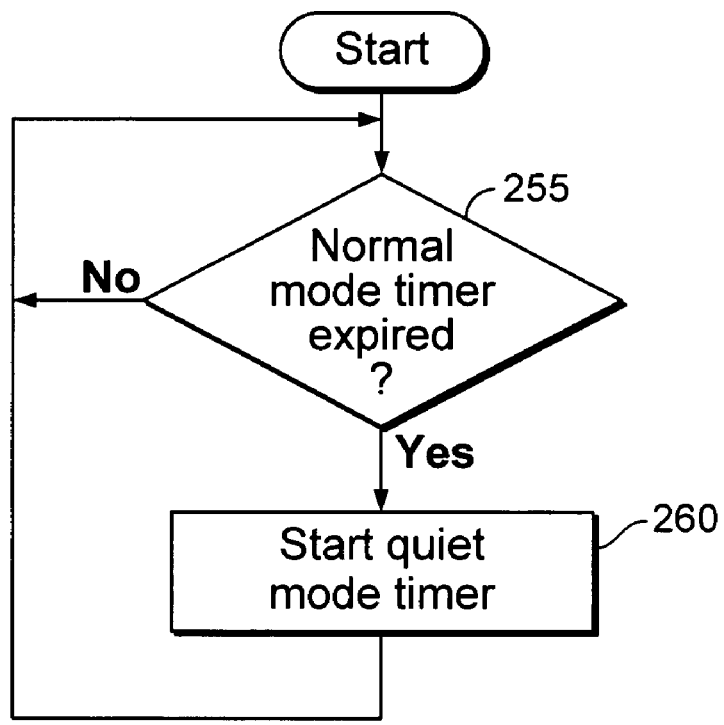
FIG. 2C shows processes for a quiet mode timer.

The NDC (106) is configured to recognize a particular timing sensitive packet when it is output from the first node (101). FIGS. 2A-2C depict a set of operations implemented by the NDC (106) according to some embodiments. Specifically, FIG. 2A illustrates a packet handling process implemented by the NDC and FIGS. 2B and 2C show processes for a normal mode timer and a quiet mode timer, respectively, used by the NDC as described below. Referring first to FIG. 2A, it is determined whether a designated timing sensitive packet has been received or is stored in a queue (206). In some embodiments, timing sensitive packets are always transmitted when they are received and are never stored in a queue for later transmission. In such embodiments, step 206 comprises determining whether a timing sensitive packet has been received. In other embodiments, a timing sensitive packet may be stored in a queue under prescribed circumstances, for example if a higher priority timing sensitive packet is received or is expected to be received at or near the same time or if the NTP is unavailable at the moment in which the timing sensitive packet is received. If a timing sensitive packet has been received or is in the queue and no higher priority packets are expected to arrive during the transmission time of the timing sensitive packet through the NTP, the timing sensitive packet is forwarded to the NTP for transmission (225). If a timing sensitive packet has not been received and there is no timing sensitive packet in the queue, it is determined whether a non-timing sensitive packet has been received or is stored in the queue (208). If no non-timing sensitive packet has been received and there are no non-timing sensitive packets in the queue, the process begins again and steps 206 and 208 are performed until either a timing sensitive packet or a non-timing sensitive packet is received or found to be present in the queue. If in step 208 it is determined that a non-timing sensitive packet has been received or is present in the queue, it is determined whether a quiet mode is in effect (210). In some embodiments, step 210 comprises determining whether a quiet mode timer was set and has not yet expired or been reset (i.e., whether the timer is running). The quiet mode timer defines a time window during which incoming non-time sensitive packets are buffered to keep the network transmission path clear for transmission of a timing sensitive packet that is expected to arrive.

Details of the quiet mode timer are discussed below in connection with FIGS. 2B and 2C. In some embodiments, the time window begins at the time the timing sensitive packet is expected to arrive. In other embodiments, the time window begins a predetermined amount of time prior to the expected arrival time of the timing sensitive packet, in order to allow time for the NTP to be cleared of non-timing sensitive packets prior to arrival of the timing sensitive packet. In some embodiments, the time window may extend beyond the expected arrival time of the timing sensitive packet, e.g., to allow for late arrival of the timing sensitive packet. In some embodiments, the time window may initially be set to expire at the anticipated arrival time of the timing sensitive packet but may be extended, for example by a prescribed amount or according to a prescribed algorithm, if the timing sensitive packet does not arrive at the anticipated time.

If the quiet mode is in effect (i.e., the quiet mode timer has been set and has not yet expired) (210) and it was determined in step 208 that a non-timing sensitive packet had been received, the received packet is either stored in a queue or discarded (270) if insufficient storage is available. If the quiet mode is in effect (i.e., the quiet mode timer has been set and has not yet expired) (210) and no non-timing sensitive packet was received (i.e., the determination in step 208 was answered in the affirmative because one or more non-timing sensitive packets were present in the queue, not because a non-timing packet not yet stored in the queue had been received), no action is taken in step 270.

If the quiet mode is not in effect (i.e., the quiet mode timer has expired or been reset, i.e., is not running) (210), it is determined whether a rate-limiting threshold has been met (215). Various rate limiting techniques may be employed depending on the implementations of the NDC. In one embodiment, the rate is limited such that data is sent to the NTP at an average rate that does not exceed the maximum data transmission capacity of the NTP (104). If the rate-limiting threshold has been met, the received non-timing packet, if any, is stored in a queue or discarded if insufficient storage is available (270). If the rate-limiting threshold has not been exceeded, a non-timing sensitive packet is transmitted (220). In some embodiments, in step 220 non-timing sensitive packets are transmitted on a first-in-first-out (FIFO) basis, such that packets stored in the queue, if any, are transmitted in the order in which they were received and prior to any subsequently received packet being transmitted. In some such embodiments, step 220 comprises storing in the queue, in a position below or after any earlier-received packets that may already by stored in the queue, a later-received packet that is not transmitted in a particular iteration of step 220 (e.g., because an earlier-received packet is stored in the queue) and has not yet been stored in the queue. In other embodiments, the FIFO approach may not be used and received packets that have not previously been stored in the queue may be transmitted prior to any packets being pulled from the queue for transmission. Once a packet has been transmitted (220), the process begins again.

Referring to FIG. 2B, whenever a designated timing sensitive packet is received (245), a normal mode timer is set (250). Preferably, the normal mode timer is set to a value according to a time interval or a specified time when the next timing sensitive packet is due to arrive minus a time value defining a window prior to the expected arrival time of the next timing sensitive packet, referred to herein as the "quiet mode", during which non-timing sensitive packets will not be transmitted to the NTP to ensure that the NTP is available to transport the timing sensitive packet when it arrives. The normal mode timer will expire after the set time value has been reached. Once the normal mode timer has been set (250), the quiet mode timer is reset (stopped) if it is running (i.e., was set and has not yet expired) (252). In some embodiments, step 252 of FIG. 2B is only performed if it is determined that a timing sensitive packet has been transmitted, to ensure that the quiet window remains in effect (i.e., no non-timing sensitive packets are transmitted) until the timing sensitive packet for which the quiet mode timer was set has been transmitted. In some embodiments, step 225 of FIG. 2A includes resetting the quiet mode timer, if set and not yet expired, and in such embodiments step 252 of FIG. 2B is omitted.

Referring to FIG. 2C, whenever the normal mode timer expires (255), the quiet mode timer is set (260). The quiet mode timer is set to a time value for an interval during which non-timing sensitive packets will not be transmitted to the NTP, as described above. The quiet mode timer will expire after the quiet mode time value has been reached.

Preferably the normal mode timer anticipates the periodicity of a designated timing sensitive packet. The quiet mode timer is used to control the flow of non-timing sensitive packets to the NTP (104) such that non-timing sensitive packets will not occupy the network transmission path at times when a timing sensitive packet is anticipated to arrive. In some embodiments, the NDC (106) is configured to set a normal mode timer to a particular interval $T_N$, upon reception of a timing sensitive packet, which corresponds to the known periodic transmission interval of the timing sensitive packets. For example, assume that the network transmission path (104) has a maximum transmission rate $T_3$ of 1 Mbps and the interfaces of the first node (101) to the network transmission path (104), $T_{1\ and\ T2}$, are Ethernet connections that have a maximum transmission capacity of 10 Mbps. Further assume that the designated timing sensitive packet is transmitted at a periodic interval of 1 second. For the remaining description of this example the designated timing sensitive packets will be referred to as "1 pps packets", although the techniques described are also applicable to timing sensitive packets having a different arrival rate.

Figure 3A:
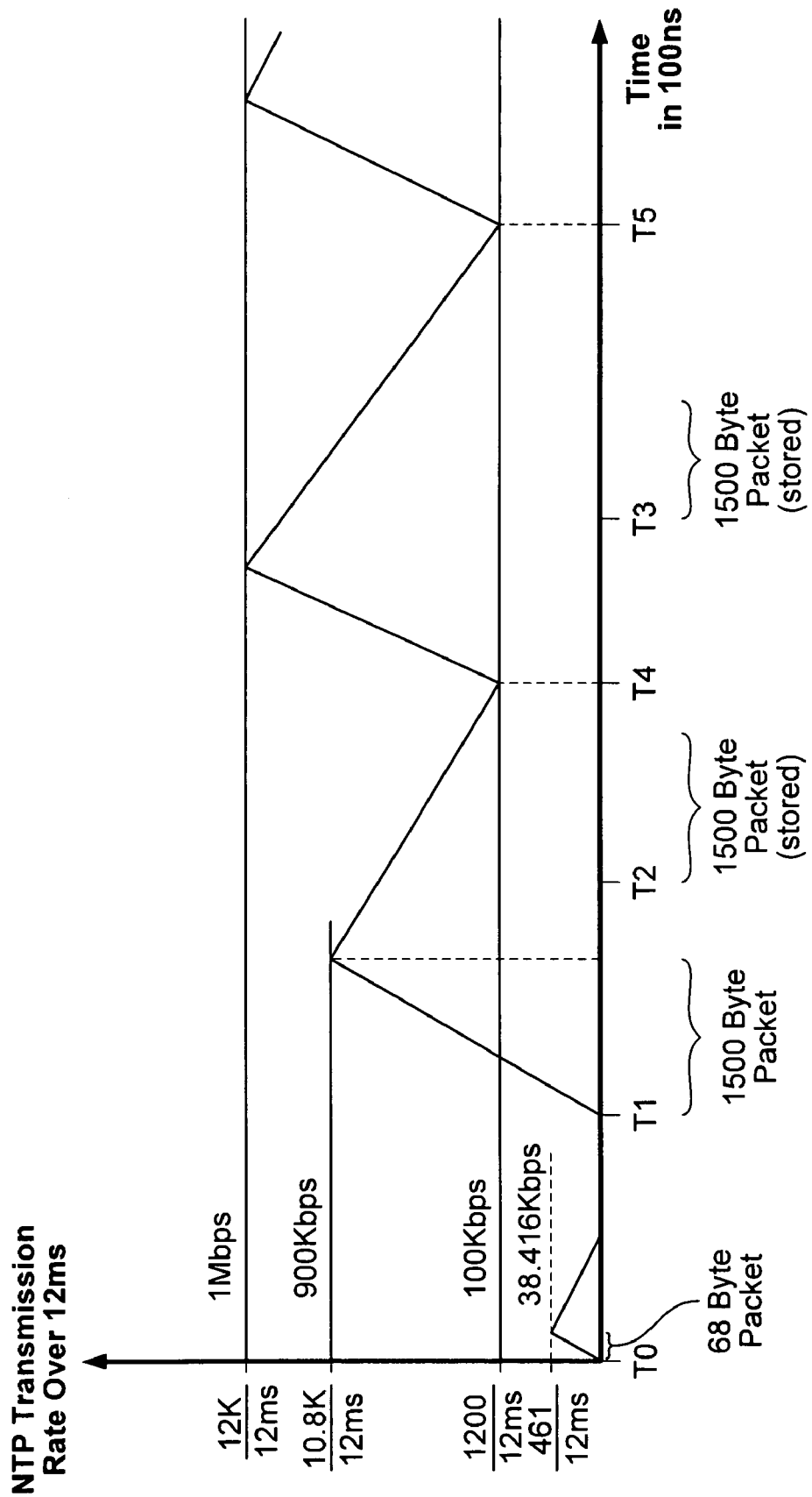
FIG. 3A provides a graphical representation of the transmission rate of a NTP over a 12 mS interval.

Prior to the expiration of the normal mode timer, all non-1 pps packets received by the NDC (106) will be rate-limited and forwarded, as appropriate, to the NTP (104). FIG. 3A provides a graphical representation of the transmission rate of the NTP (104) over a 12 mS interval as regulated by the NDC (106) in one embodiment. As shown in FIG. 3A, a maximum NTP transmission rate of 12 Kbits/12 mS or 1 Mbps is designated. Also in FIG. 3A, a threshold transmission rate of 1200 bits/12 mS or 100 Kbps is designated. If the computed NTP transmission rate substantially exceeds the threshold transmission rate of 100 Kbps, then packets received by the NDC (106) are not forwarded to the NTP (104). As shown in FIG. 3A, at time zero T0, a 64 byte packet is forwarded to the NTP (104). Because the NDC/NTP interface is relatively fast, the instantaneous computed transmission rate quickly increases to a maximum rate of 38.416 Kbps at the time when the entire packet is completely transferred to the NTP (104). As the NTP (104) propagates the packet, the transmission rate over a 12 mS window, reduces to zero. At T1 a maximum-sized packet of 1500 bytes is transferred to the NTP. As the packet is transferred to the NTP (104), the computed transmission rate over a 12 mS interval peaks at 900 Kbps. While the packet is propagated through the NTP (104), another maximum sized packet is received by the NDC (106) at time T2. However, the packet is not forwarded to the NTP until the computed transmission rate over a 12 mS time window is substantially 100 Kbps, e.g., at or near time T4 in the example shown. As the second packet is transmitted to the NTP (104), the computed NTP (104) transmission rate peaks at 1 Mbps when the second packet is completely transferred to the NTP (104) Similarly, a subsequent maximum sized packet received at T3 would be stored and not forwarded to the NTP until the computed transmission rate over a 12 mS time window is substantially 100 Kbps, i.e., at or near time T5 in the example shown. Typically, a maximum-sized packet for Ethernet is 1,500 bytes. If the network is configured to accept a 1,500 byte maximum-sized packet, then it will take a maximum of 1500 bytes*8 bits/byte*1 sec/10 Mb or 1.2 milliseconds to transfer a packet from the NDC (106) to the NTP (104). If the NTP (104) begins to transmit as soon as data is received from the NDC (106), then by the time an entire maximum-sized packet is received by the NTP (104), the NTP (104) will already have transmitted approximately 1,200 bits of the same packet at the 1 Mbps rate. Consequently, the NTP (104) will need to store approximately 12,000 bits (1500 bytes*8 bits/byte) minus 1,200 bits or 10,800 bits to accommodate a maximum-sized packet. For the purposes of this example, assume that the rate limiting function operates to ensure that a computed NTP transmission rate of no more than 100 Kbps is necessary before a packet received by the NDC (106) is transferred to the NTP (104). As a result, the normal mode timer should be set to allow the maximum amount of data stored in the NTP (104) to propagate out of the NTP (104) by the time the next 1 pps packet is due to arrive, in the worst case. For 10,800 bits of information transmitted at 1 Mbps, the normal mode timer should be set to expire in 1 second minus 10.8 milliseconds or 989.2 milliseconds. When the normal mode timer expires (255), a quiet timer is set (260). The quiet timer should be set to run for at least the duration of time beginning from the expiration of the normal mode timer until the expected time of the next 1 pps packet. Preferably, the quiet mode timer will be set to run for a slightly longer duration to provide margin for jitter with respect to the arrival time of the next 1 pps packet. After the expiration of the normal mode timer and prior to the expiration of the quiet window timer, any packets received from the first node (100) that are not time sensitive packets are not forwarded to the NTP (104) but are stored by the NDC (106) if storage is available. If a relatively small packet is received and it is determined that it could be forwarded and that the transmission rate over 12 mS would be equal to zero when the next timing sensitive packet is expected, then it may be optionally transferred to the NTP (104). Otherwise the non-time sensitive packets are discarded. Thus, the normal mode timer is preferably set to a value that corresponds to the time interval at which the next time sensitive packet is expected minus the time required to clear any stored data in the network transmission path (104). The quiet timer is preferably set to limit the length of time for which non-timing sensitive data transmission over the network transmission path (104) is throttled. After a timing sensitive packet is received, detected and forwarded by the NDC (106), the quiet timer is cleared (252) and all other data traffic stored or received by the NDC (106) is rate limited and forwarded to the network transmission path (104). If the next expected timing sensitive packet is significantly delayed or does not arrive and the quiet timer expires, then all data traffic stored or subsequently received by the NDC (106) is rate limited and forwarded to the network transmission path (104).

Alternatively, the normal mode timer can be set to expire when the next designated timing sensitive packet is due to arrive and the quiet mode timer can be set at a predetermined time before the normal mode timer is set to expire.

In the example described above and depicted in FIGS. 2A-2C, the rate transition in which data is received at 10 Mbps and output data 1 Mbps may alternatively be incorporated within the NDC (106). Such a configuration or rearrangement of functionality does not need to alter the operation of the NDC (106) with respect to the handling of designated timing sensitive packets, the operation of the normal mode timer, the quiet timer, etc. The partitioning of functionality assumed for the examples described in this disclosure have been chosen in large part for the purpose of providing clarity in the disclosure. Other logical and physical groupings and arrangements of network elements are possible, depending on the implementation or environment.

In the embodiments described above and illustrated in FIGS. 1-2C, the transmission of data to the NTP (104) is throttled according to a worst case assumption of the buffer utilization within the NTP (104) based on the particular rate limiting method used. That is, data is throttled for a period of time that presumes that the data buffers within the NTP (104) are no larger than that required to accommodate a maximum-sized packet. The NDC (106) limits the maximum rate according to the NTP (104) based on the transmission time of a maximum-sized packet. Alternatively, the NDC may monitor NTP buffer utilization. This is beneficial if the NTP can store more than a maximum-sized packet, thus better utilizing storage available in the NTP. In some embodiments, the NDC keeps track of the buffer utilization within the network transmission path and forwards incoming non-time sensitive packets according to their size, the current amount of data estimated in the NTP buffer and the time remaining before the next time sensitive packet is expected to arrive.

Figure 3B:
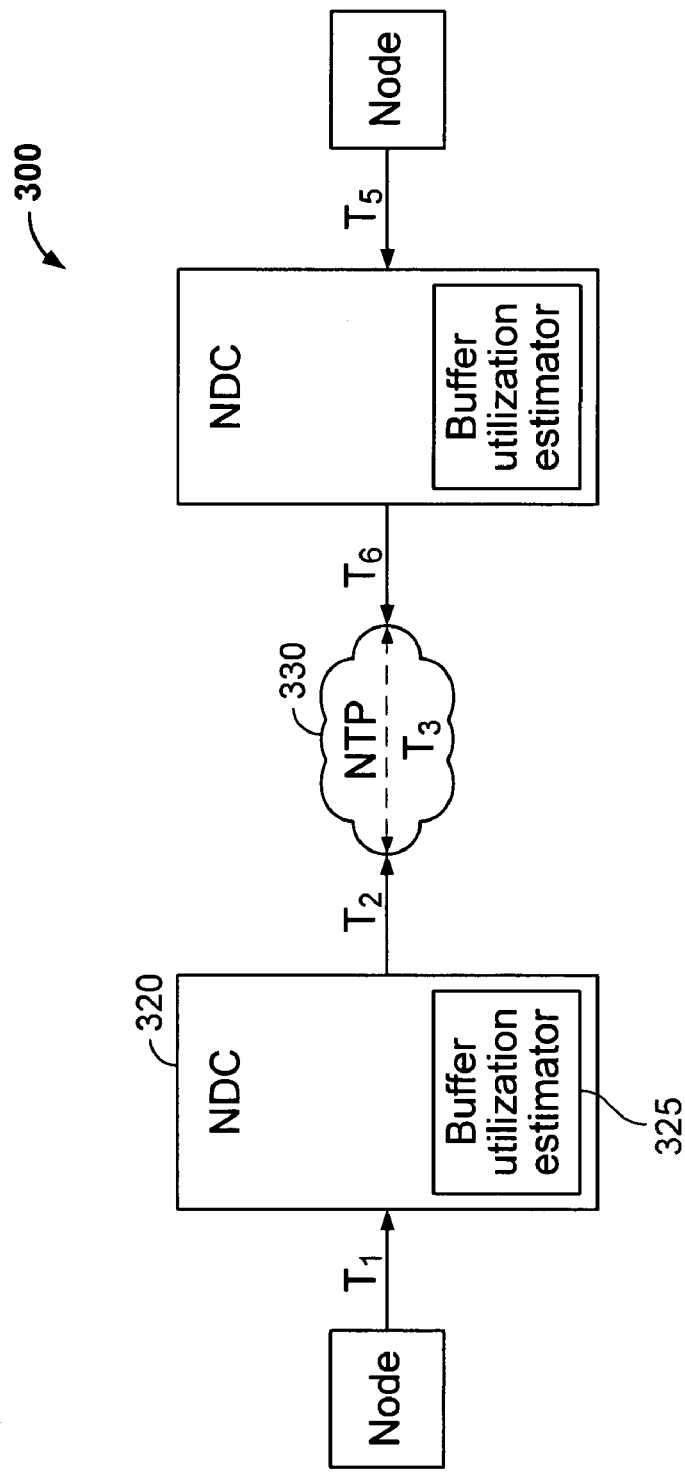
FIG. 3B illustrates an embodiment in which the network delay controller is configured to estimate buffer utilization within a NTP.

FIG. 3B illustrates an embodiment in which the network delay controller is configured to estimate buffer utilization within the NTP, as suggested in the paragraph immediately above. The network configuration (300) includes a NDC (320), which controls the flow of data packets into the NTP (330) in part through the use of a buffer utilization estimator (325). In this example, it is assumed that the maximum data rate T3 through the NTP is less than the maximum data rate of both T1 and T2. As packets are transmitted from the NDC (320) to the NTP (330), the buffer utilization estimator (325) keeps track of the amount of packet data stored in the NTP (330) as the packets propagate through the NTP (330). Given a current reading of the buffer utilization estimator (325), the transmission speed of the NTP (330), and the time remaining before a designated time sensitive packet is due to arrive, the NDC (320) operates to ensure that no data is stored in the NTP (330) buffer at the expected arrival time of the next time sensitive packet.

Figure 4A:
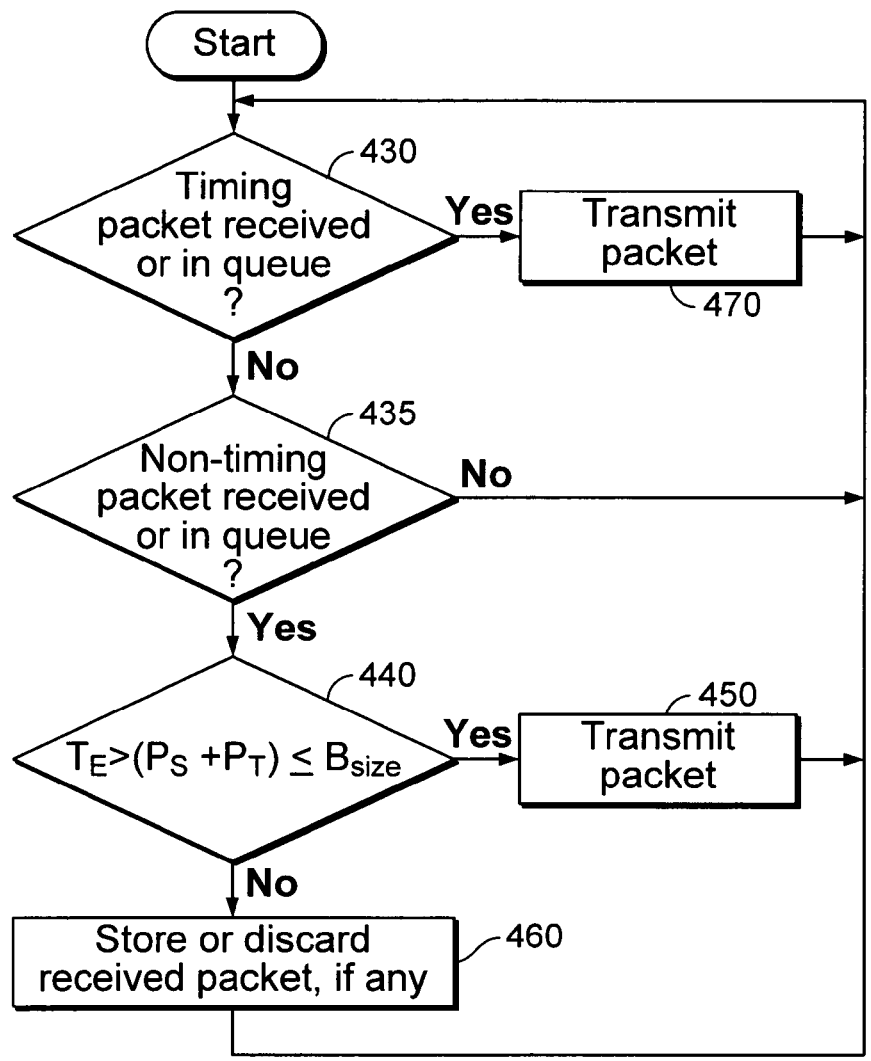
FIG. 4A shows a process by which packets are received and transmitted via a NTP.
Figure 4B:
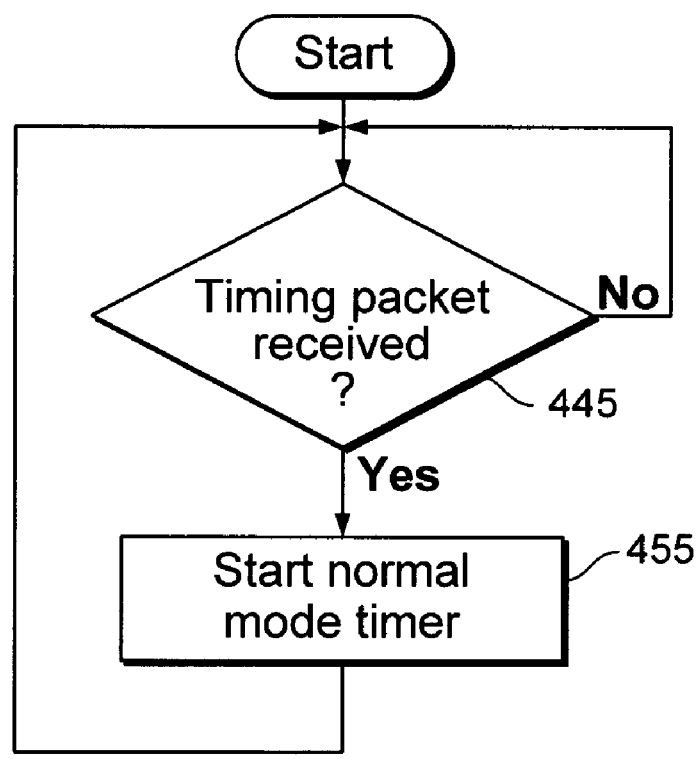
FIG. 4B illustrates the operation of a normal mode timer used to determine when the normal mode of operation illustrated in FIG. 4A is in effect.
Figure 4C:
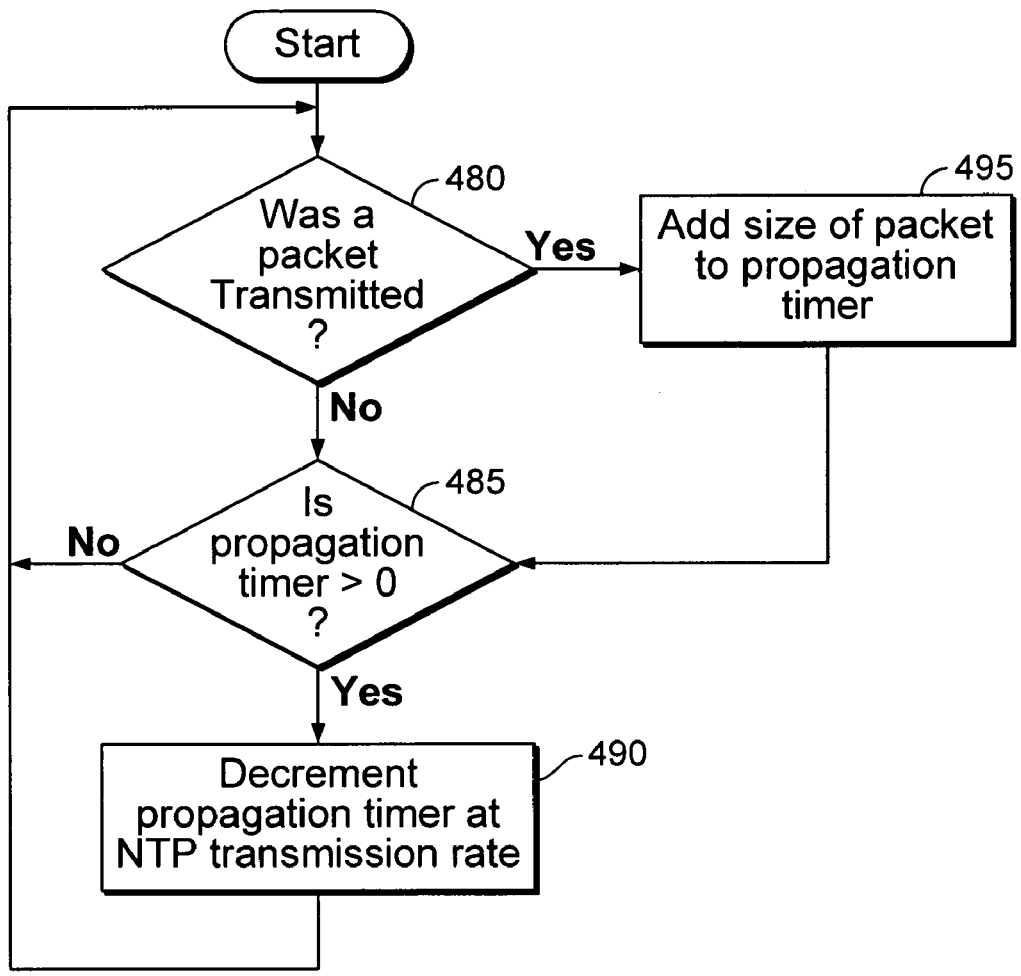
FIG. 4C shows how the current buffer utilization in a NTP is estimated by means of a propagation timer.

FIGS. 4A-4C illustrate a set of processes such as may be implemented on a NDC to estimate NTP buffer utilization and control packet flow in light of the estimate. FIG. 4A shows a process by which packets are received and transmitted via a NTP based on estimated NTP buffer utilization and the expected arrival time of a timing sensitive packet. FIG. 4B illustrates the operation of a normal mode timer used to determine when the normal mode of operation illustrated in FIG. 4A is in effect. FIG. 4C shows how the current buffer utilization in the NTP is estimated by means of a propagation timer.

In one embodiment, the NDC 320 of FIG. 3B implements the processes of FIGS. 4A-4C. In operation, the NDC may forward packets to the NTP and maintain an estimate of the NTP buffer utilization. In the following description, the actual capacity of the NTP buffer is not necessarily taken into account by the NDC. Also, when the capacity of the NTP is the minimum required for a maximum-sized packet, the NTP buffer utilization algorithm becomes equivalent to the rate limiting algorithm. In the following example, it is assumed that the NDC includes design parameters that account for the size of the NTP buffer as well as the transmission speed of the NTP. The instantaneous buffer utilization of an NTP can be estimated through a current reading of a propagation timer. When a packet is transmitted by the NDC to the NTP, a propagation timer is set according to the size of the transmitted packet. After being set, the propagation timer begins to countdown in accordance with the transmission rate of the NTP. When additional packets are transmitted by the NDC, the size of each packet is added to the current contents of the propagation timer. In this way, the NDC maintains a running estimate of the amount of quiet time it would take (i.e., the length of the interval without further packets being transmitted to the NTP) to clear the NTP buffer, e.g., to ensure the buffer is empty when the next timing sensitive packet arrives.

Referring to FIG. 4A, the NDC determines if a timing sensitive packet has been received or is stored in a queue (430). If a timing sensitive packet has been received or is in the queue, it is transmitted (470). If no timing sensitive packet has been received and there is no timing sensitive packet in the queue, the NDC checks to see if a non-timing sensitive packet has been received or is present in the queue (435). If no non-timing sensitive packet has been received and there are no non-timing sensitive packets in the queue, to NDC continues to check for the receipt or presence in the queue of either a timing sensitive or non-timing sensitive packet (430 and 435). If a non-timing sensitive packet has been received or is present in the queue, the NDC checks if the packet can be transmitted through the NTP before the next timing sensitive packet arrives and without overflowing the NTP buffer (440). To do so, the NDC compares the sum of the packet size (Ps) of the next non-timing packet due to be transmitted and the contents of a propagation timer (Pt), described more fully below in connection with FIG. 4C, with the buffer size of the NTP (Bsize) (440). This comparison determines whether adding a packet of the size of the received packet (Ps) to the data already estimated via the propagation timer to be in the NTP buffer (Pt) will exceed the capacity of the buffer. The NDC also compares the sum of Ps and Pt, expressed as a quiet time required to clear the buffer (i.e., Ps+Pt divided by the transmission rate of the NTP), with the time until the next timing sensitive packet is expected to arrive (Te) (440). In some embodiments, Te equals the time remaining on the normal mode timer the operation of which is illustrated in FIG. 4B. In some embodiments, the normal mode timer expires at a time other than the expected arrival time of the next timing sensitive packet, e.g., a time shortly before or shortly after the expected arrival time. In some such embodiments, the time Te until the next timing sensitive packet is expected to arrive is derived from the time left prior to expiration of the normal mode timer, e.g., by adding or subtracting a prescribed offset from the time left prior to expiration of the normal mode timer. In other embodiments, a separate timer may be used to keep track of the time Te until the next timing sensitive packet is expected to arrive. If the sum of Ps and Pt is less than or equal to Bsize (440) and is less than Te, then a non-timing sensitive packet is forwarded to the NTP (450). As described above in connection with step 220 of FIG. 2A, the algorithm used to determine which non-timing sensitive packet is transmitted in step 450 if more than one packet is available to be transmitted may be different for different configurations and/or implementations. If the sum of Ps and Pt is greater than Bsize or greater than or equal to Te (440) and an affirmative result was obtained step 435 because a non-timing sensitive packet had been received but not yet stored in the queue (i.e., not because one or more such packets were already present in the queue), then the received packet is stored in the queue if storage is available or discarded if no storage is available (460).

FIG. 4B illustrates a process for controlling the starting of a normal mode timer. In step 445, it is determined whether a timing sensitive packet has been received. Each time such a packet is received, the normal mode timer is started (455).

Preferably the timer settings and/or decision criterion employed in the NDC are chosen to allow for some arrival time variance of expected time sensitive packets. If the normal mode timer expires, that condition indicates in the example shown in FIGS. 3B and 4A-4C that the next timing sensitive packet did not arrive substantially when expected, thus the timer expiration is equivalent to a timeout. In one embodiment, a timeout causes a default condition such that Te is presumed to be greater than the sum of Ps and Pt until the normal timer is restarted, e.g., by receipt of a subsequent timing packet, such that by operation of steps 435, 440, and 450 the transmission of non-timing packets, if any are received or present in the queue, will continue so long as the input buffer of the NTP is not too full. Preferably, in the example shown in FIGS. 3B-4C, the normal mode timer is set to a value slightly greater than the time of the next expected timing sensitive packet to allow for residual network jitter. In some embodiments, in the event of a timeout (i.e., expiration of the normal mode timer prior to arrival of an expected timing sensitive packet) the normal mode timer or a secondary timer may be started based on the anticipated arrival time of the next timing sensitive packet that is expected to arrive, e.g., based on a known or expected periodicity with which the timing sensitive packets are expected to arrive. In such embodiments, the normal mode timer is restarted, or a secondary timer is started, to restore normal operation in anticipation of the arrival of a timing sensitive that is expected to arrive after the timing sensitive packet for which the normal mode timer was originally set. Such a configuration would enable normal operation to resume in the event an expected timing sensitive packet never arrived, e.g., because it was dropped or otherwise lost in transit in the upstream network.

FIG. 4C illustrates the operation of the propagation timer in the example shown in FIGS. 4A-4C. When a packet is forwarded to the NTP (480), as in steps 450 and/or 470 of FIG. 4A, the number of bits in the packet is added to the contents of the propagation timer (495). When the contents of the propagation timer are greater than zero (485), the propagation timer is decremented (490) at the same rate as the maximum transmission rate of the NTP. The contents of the propagation timer indicate the amount of data currently buffered in and propagating through the NTP. The contents of the propagation timer, when divided by the transmission rate of the NTP, indicate the time remaining in which all of the data will propagate through the NTP.

Some network configurations may transport a plurality of designated timing sensitive packet streams. Preferably, when more than one type of timing sensitive packet is designated and recognized by the NDC, the different types of timing sensitive packets are prioritized relative to each other. Further, in an embodiment in which normal mode and quiet mode timers are used, e.g., FIGS. 1-2C, a separate normal mode timer and a separate quiet mode timer are maintained for each designated timing sensitive packet recognized by the NDC. When the quiet window of a lower priority timing sensitive packet coincides with the quiet window of a higher priority timing sensitive packet, the lower priority packet will be stored by the NDC and sent after the higher priority packet is received and forwarded to the NTP or after the higher priority quiet mode timer expires. If the NDC maintains an estimate of buffer utilization of the NTP, then a lower priority timing sensitive packet will be stored only if it is determined by the NDC that the packet would not propagate through the NTP before a higher priority packet is expected to arrive.

Some network protocols include a provision to adapt the rate of incoming traffic according to capacity and congestion parameters of a destination network path. For Ethernet, this may be accomplished through the use of pause packets. When a receiving node within an Ethernet network detects a condition in which it will be unable to handle received data in the immediate or near future, the node may send pause packets to an originating node, which originates the data packets. A time interval is specified in a pause packet to indicate a length of time in which no packets are to be sent to the receiving node. Pause packets may be used to more efficiently utilize data buffers distributed throughout the various nodes in a network. In general, in an embodiment such as shown in FIG. 1, pause packets can be transmitted by the NDC (106) to the first node (101) without substantially affecting the network delays of designated timing sensitive packets if the pause packets are timed such that the first node (101) will not be paused when a designated timing sensitive packet is due to be transmitted.

The embodiments described above focus primarily on addressing the issue of rate transmission jitter and its effect on timing sensitive packets. However, a network delay controller can in addition and/or instead be used to substantially eliminate arbitration delays for timing sensitive packets caused when multiple sources of network traffic attempt to transmit through a common network port. As used herein, the term "arbitration delay" refers to delay in transmission through an intermediate node or common network port of data sent by a first sending node because the intermediate node or common network port is busy forwarding data sent via the same intermediate node or common port by a second (or a plurality of other) sending nodes. Traditionally, such arbitration delays are minimized for selected packets through a prioritization scheme in which high priority packet types are always put at the top of a queue of packets destined to be transmitted out of a particular network port. For example, Ethernet is capable of providing such prioritization through the use of virtual local area network (VLAN) tagging. Even with prioritization methods however, high priority, timing sensitive packets still incur random delays according to the arbitrary status of a particular network output port. Such random delays caused by potentially variable arbitration delay are referred to herein as "arbitration jitter". Specifically, a high priority packet will be delayed if it becomes available to be transmitted by a network port while another packet transmission is already in progress.

Figure 5:
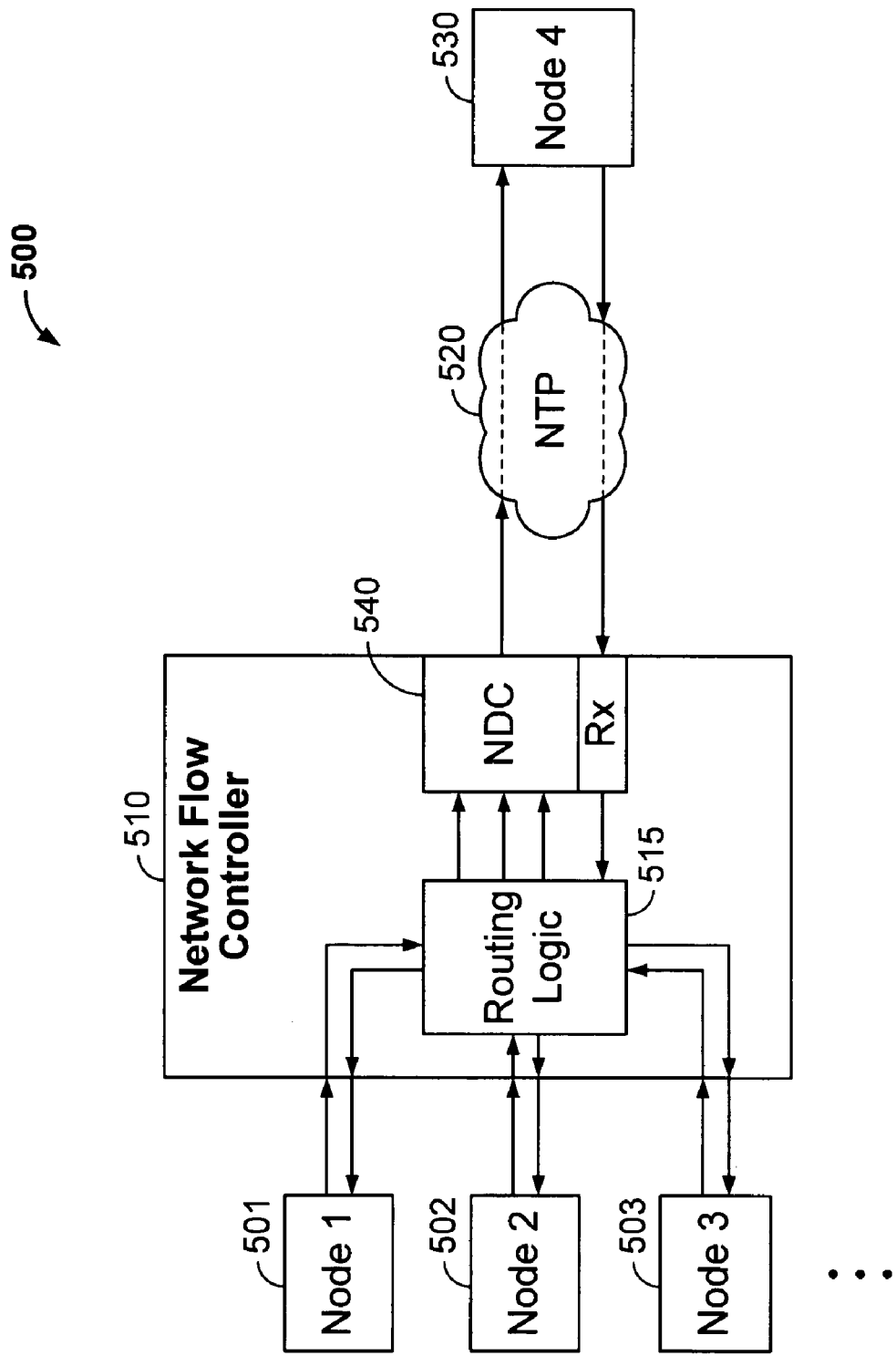
FIG. 5 shows a network configuration in which a first, second and third node are coupled to transmit network packet data to a network flow controller

Referring to FIG. 5 a network configuration (500) is depicted in which a first, second and third node (501, 502 and 503 respectively) are coupled to transmit network packet data to a network flow controller (510). The network flow controller (510) includes network functionality commonly found in network equipment such as hubs, switches and routers. In FIG. 5, the network flow controller (510) manages the flow of network packets transmitted by first, second and third nodes (501, 502 and 503 respectively) to an output network port coupled to the network transmission path (520). Thus, in FIG. 5, first, second and third nodes (501, 502 and 503) are all capable of transmitting network packets to a fourth node (530) through the network flow controller (510) and the NTP (520). Depending on the particular type, the network flow controller may steer some network traffic from some ports to other ports. An Ethernet hub, for example, does not typically steer traffic. Instead, any network traffic received at one port of a hub is simply output at all of the other ports on the hub. Other network flow controllers, such as switches and routers, typically "learn" to steer data traffic containing a particular destination address to a port where data traffic having the same source address has originated. Many different modes and methods of steering traffic are used in practical network equipment. The network flow controller (510) includes a routing logic function (515), which may include any arbitrary method for steering network traffic. The network flow controller (510) also includes a network delay controller (540) to minimize arbitration jitter for the transmission of designated timing sensitive packets. The routing logic selectively couples traffic from the first, second and third nodes (501, 502 and 503 respectively) to the NDC (540). The particular functional partitioning shown in the network flow controller (510) is not exclusive. In fact, many alternative architectures of the network flow controller (510) that incorporate a NDC (540) are possible. In operation, substantially random packet traffic is generated by the first, second and third nodes (501, 502 and 503 respectively) and transported to the fourth node (530) through the network flow controller (410) and the NTP (520). The NDC (540) detects a designated timing sensitive packet among the packets received by the network flow controller (510). When a timing sensitive packet is detected, it is placed at the beginning of a queue of packets to be transmitted to the fourth node (530) through the NTP (520). At approximately the same time, a normal mode timer is set to expire according to an interval of time in which the next corresponding designated timing sensitive packet is expected to be available to be transmitted by the network flow controller (510). Using the normal mode timer, the NDC (520) will ensure that when the next timing sensitive packet arrives, no other packet transmissions to the NTP (520) and fourth node (530) will begin or be in progress. If the transmission rate of the NTP (520) from the network flow controller (510) to the fourth node (530) is less than the transmission rate of the network flow controller (510), the NDC may also compensate for jitter caused by a transmission rate reduction in the network path.

Figure 6A:
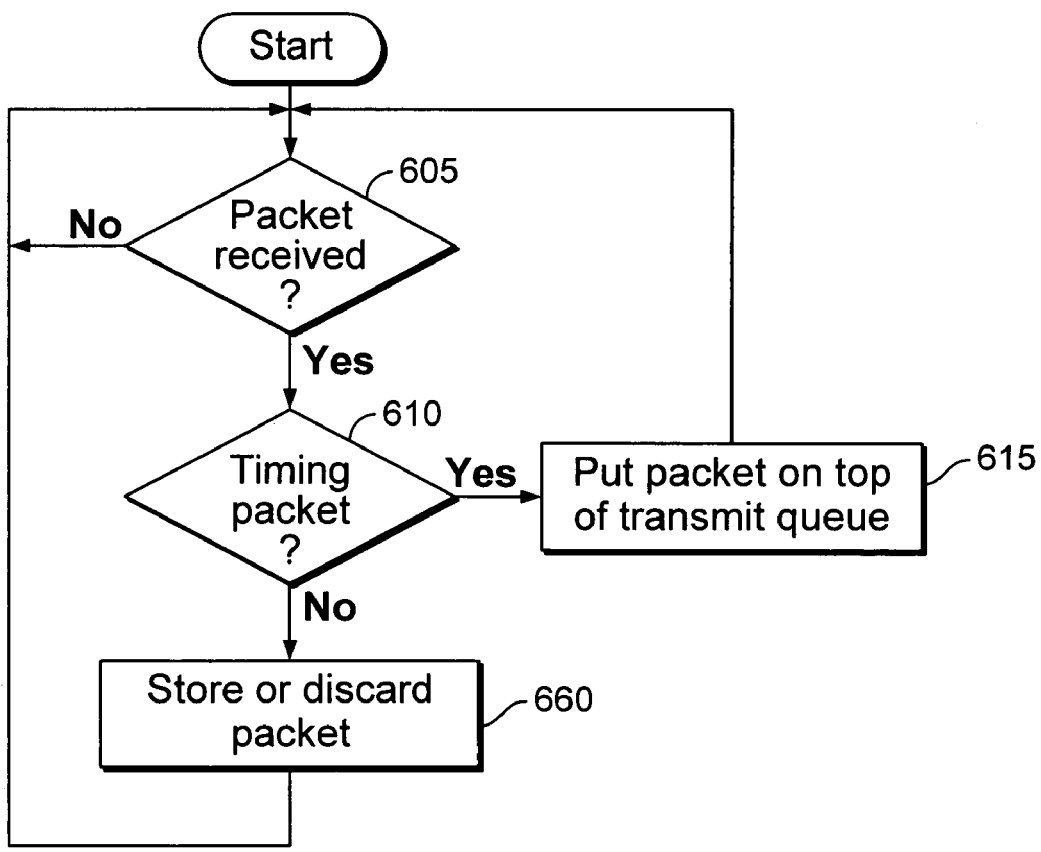
FIGS. 6A-6D illustrate the operation of the NDC minimizing arbitration jitter within the network flow controller and propagation jitter related to a NTP.
Figure 6B:
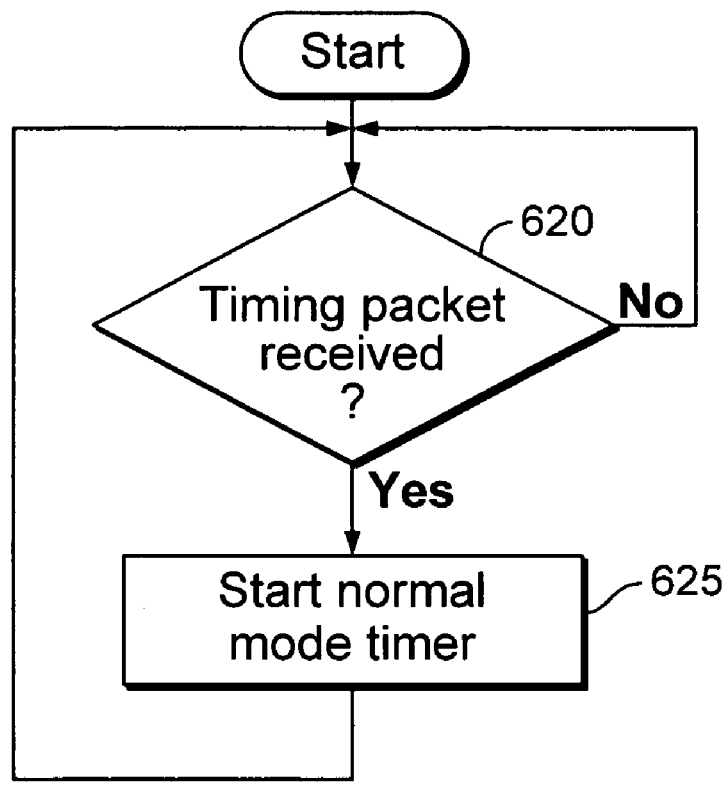
Figure 6C:
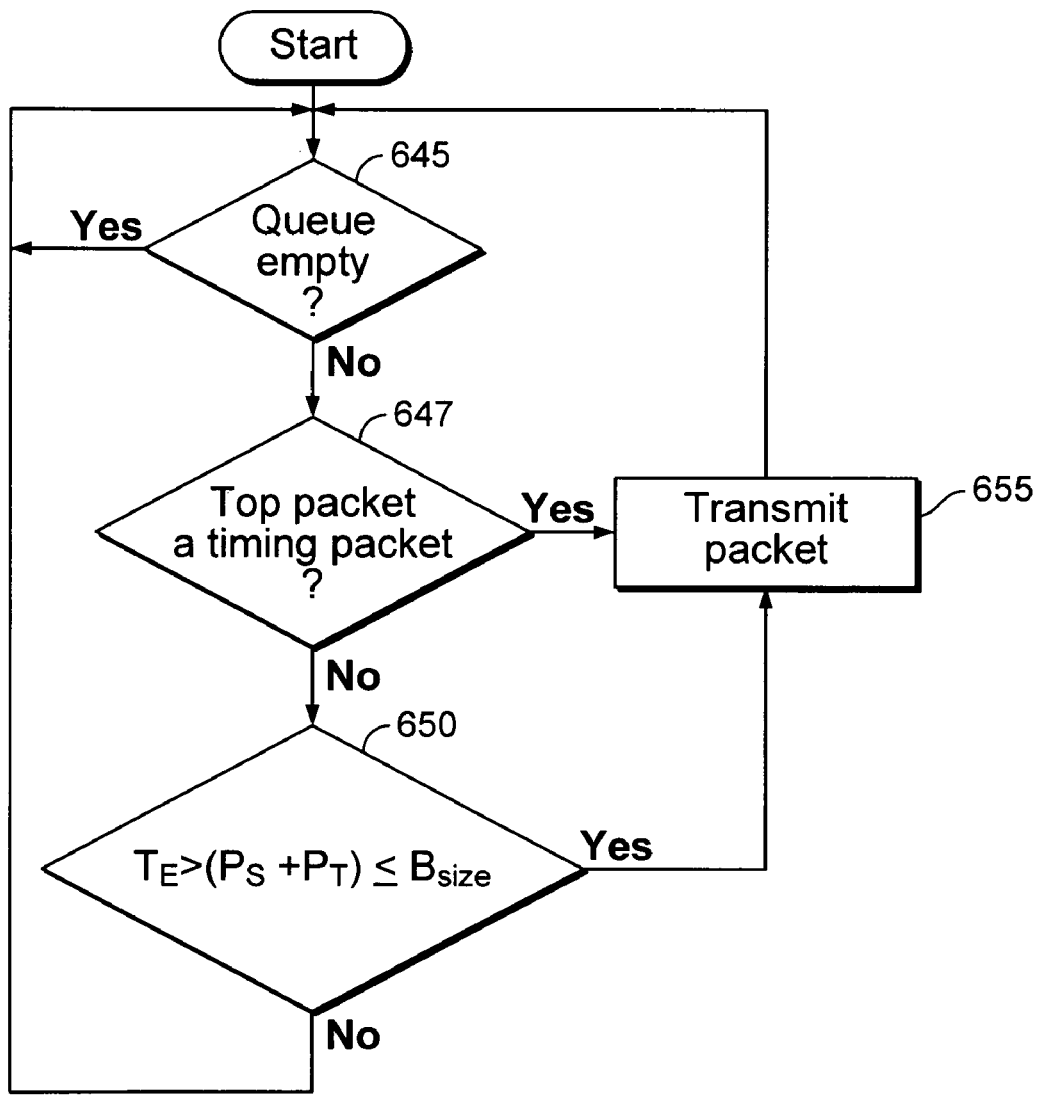
Figure 6D:
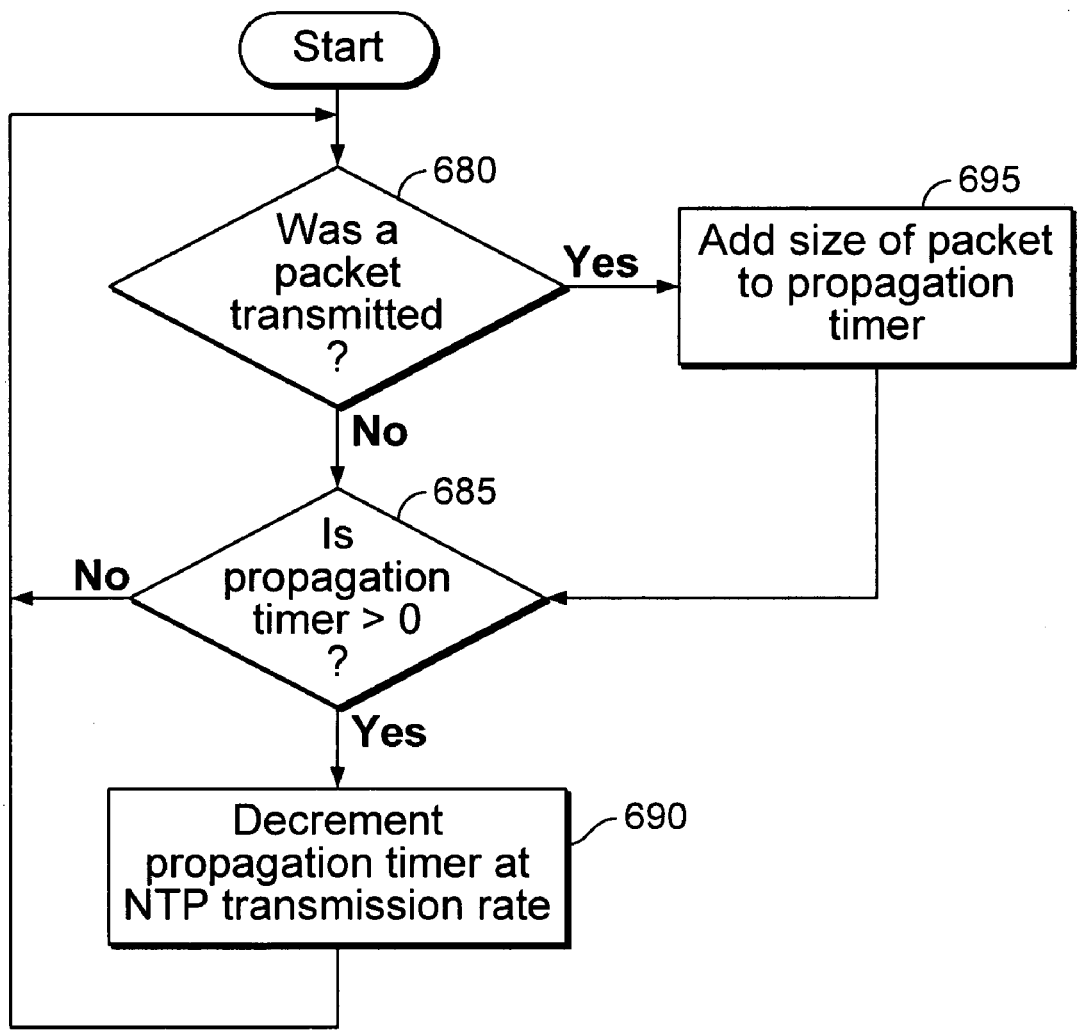

FIGS. 6A-6D illustrate the operation of the NDC (540) to minimize arbitration jitter within the network flow controller (510) and propagation jitter related to the NTP (520). Propagation jitter related to the NTP may be exhibited when the transmission rate of the NTP is less than the transmission rate of the network flow controller to the NTP as discussed above. FIG. 6A shows a process by which packets received from one of a plurality of input ports (e.g., from nodes 1, 2, 3, etc. of FIG. 5) are added to a queue of packets to be transmitted via a NTP. FIG. 6B illustrates the operation of a normal mode timer used to determine when the normal mode of operation illustrated in FIGS. 6A and 6C is in effect. FIG. 6C depicts a process by which packets are pulled from the queue for transmission via the NTP. FIG. 6D shows how the current level of buffer utilization in the NTP is estimated by means of a propagation timer.

As shown in FIG. 6A, the NDC detects whether a packet is received (605). If the received packet is a timing packet (610), the packet is put at the top of the queue of packets to be forwarded to the NTP (615), and the normal mode timer is set (620 and 625 of FIG. 6B). Note that if the transmission rate of the NTP is equal to or greater than the transmission rate of the network flow controller interface to the NTP, the propagation timer has no effect in the NDC and need not be included. If a received packet is not a timing packet (610), then the received packet is stored in the queue or discarded if the queue is full (660).

FIG. 6C illustrates a process by which packets are pulled from the queue and transmitted in the example shown in FIGS. 5 and 6A-6B. In the process of FIG. 6C, which runs in parallel with the processes of FIGS. 6A and 6B, the transmit queue is checked to determine whether it is empty (645). If it is not empty, the NDC determines whether the top packet in the queue is a timing sensitive packet (647). If the top packet is a timing sensitive packet, it is transmitted via the NTP (655). If the top packet is not a timing sensitive packet, it is determined whether the packet in the queue can be fully propagated through the NTP before the arrival of the next expected timing sensitive packet without overflowing the buffer of the NTP (650). If so, a non-timing sensitive packet from the queue is transmitted (655) and the transmit queue is again checked to determine whether it is empty (645). If it is determined that a packet in the queue can not be fully propagated through the NTP before the arrival of the next expected timing sensitive packet without overflowing the buffer of the NTP (650), no packet is transmitted at that time.

FIG. 6D illustrates the operation of the propagation timer in the example shown in FIGS. 4A-4C. When a packet is forwarded to the NTP (680), as in step 655 of FIG. 6C, the number of bits in the packet is added to the contents of the propagation timer (695). When the contents of the propagation timer are greater than zero (685), the propagation timer is decremented (690) at the same rate as the maximum transmission rate of the NTP. The contents of the propagation timer indicate the amount of data currently buffered in and propagating through the NTP. The contents of the propagation timer, when divided by the transmission rate of the NTP, indicate the time remaining in which all of the data will propagate through the NTP.

In order for a network delay controller to efficiently utilize the available bandwidth of a given network transmission path it is important that the NDC have a reasonably accurate estimation of the maximum throughput capacity of a network transmission path. Further enhancements in transmission efficiency can be obtained if a NDC has a substantially accurate estimation of the storage available in a NTP. In practice however, the maximum transmission rate and buffer capacity of a particular network transmission path may be arbitrary and unanticipated for a general purpose and widespread deployment of network delay controllers to various network configurations.

Figure 7:
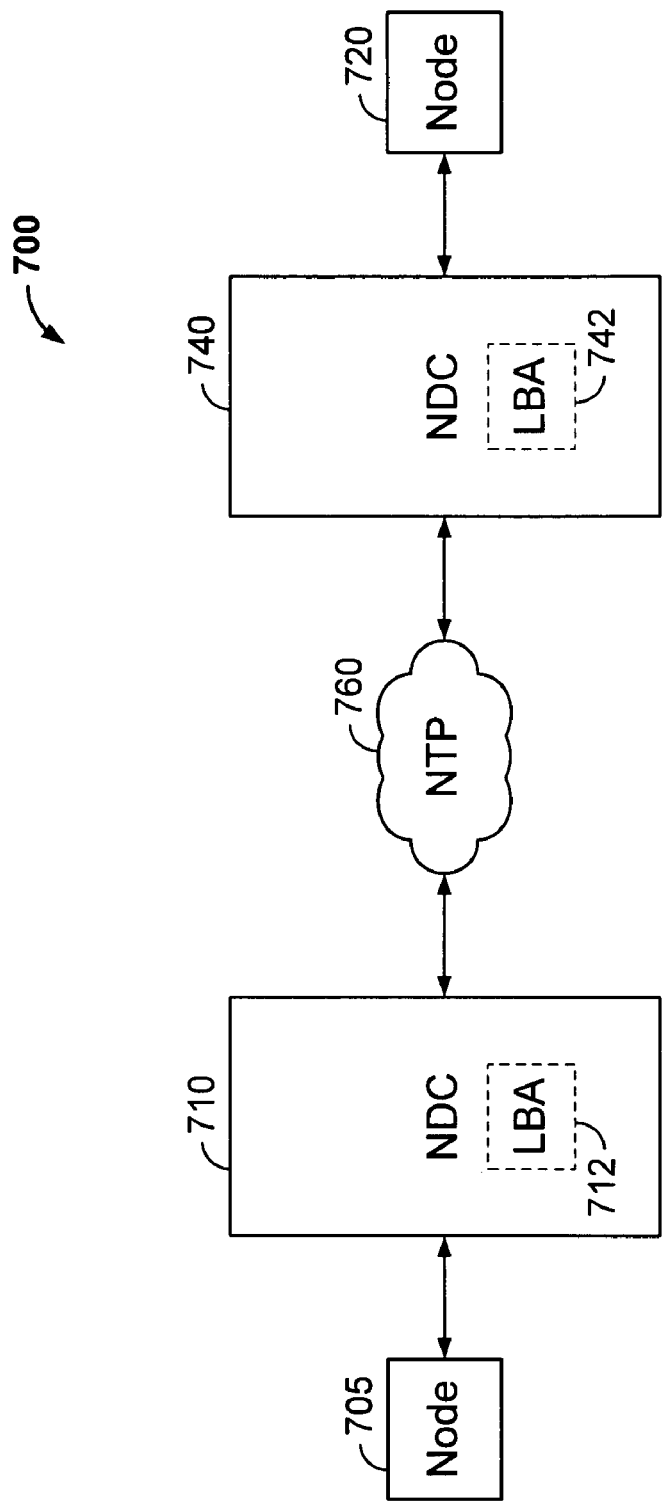
FIG. 7 depicts a network configuration that includes a link bandwidth analyzer (LBA) used to automatically estimate the bandwidth and input buffer size of a given NTP.
Figure 8:
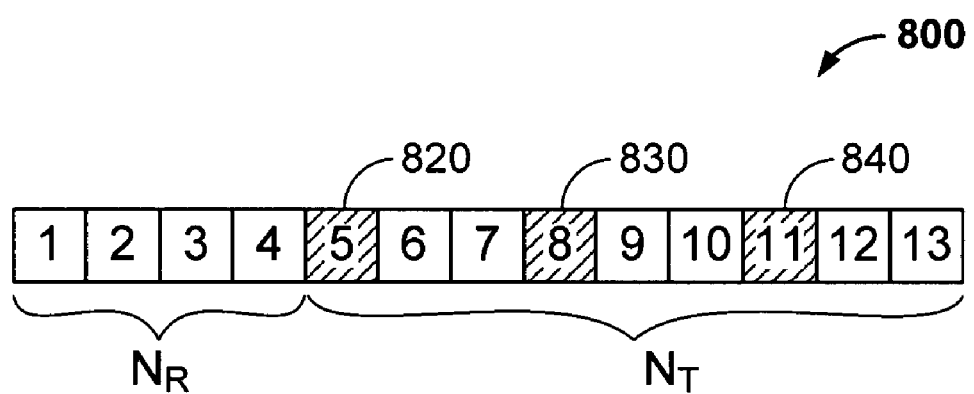
FIG. 8 depicts an example sequence of 13 packets transmitted by a second NDC.

FIG. 7 depicts a network configuration (700) that includes a link bandwidth analyzer (LBA) used to automatically estimate the bandwidth and input buffer size of a given NTP. The network configuration (700) includes a first node (705) coupled to a first NDC (710) and a second node (720) coupled to a second NDC (740). As shown in FIG. 7, the second NDC (740) includes a LBA (742). During the analysis of the NTP (760), substantially all network traffic from nodes 1 and 2 (705 and 720 respectively) is prevented from propagating through the NTP (760). The LBA (742) begins operation by transmitting a sequence of packets through the NTP (760) to the first NDC (710) at the maximum transmission rate of the second NDC (740) network interface. FIG. 8 depicts an example sequence of 13 packets (800) transmitted by the second NDC (740). Preferably, to increase the accuracy of the NTP (760) buffer estimation, the transmitted packets are small and equal in size. The sequence of packets is preferably large enough to ensure that any buffers associated with the NTP (760) will overflow if the transmission rate of the NTP (760) is lower than that of the NDC (740). Each packet transmitted includes a sequence number, which indicates the position of each particular packet within the series of packets sent by the second NDC (740). The LBA (712) examines the sequence number of each packet received from the second NDC (740). If no missing sequence numbers are found for all of the transmitted packets, the bandwidth of the NTP (760) is assumed to be capable of supporting the maximum transmission rate of the second NDC (740) network interface. If missing received sequences are detected by the LBA (712), it is assumed that the maximum transmission rate of the NTP (760) is less than that of the second NDC (740) network interface. In FIG. 8, packets with the sequence number 5 (820), 8 (830) and 11 (840) are shaded to indicate that they were not received by the first NDC (710). When missing sequence numbers are found, the LBA (712) at the first NDC detects the number of packets received before sequence numbers were found to be missing, designated as $N_R$ in the packet sequence (800). As shown in FIG. 8, the total number of packets transmitted by the second NDC (740) minus the number of packets received before sequence numbers were found to be missing is designated $N_T$. The LBA (712) at the first NDC (710) finds the approximate ratio $P_R$ of the second NDC (740) maximum transmission rate $R_{NDC}$ compared with the maximum transmission rate $R_{NTP}$ of the NTP (760) by dividing $N_T$ by the number of packets within the subset $N_T$ that were successfully transmitted to the far end, i.e., $N_T$ minus the number of missing packets $N_M$, such that $P_R = N_T/(N_T - N_M)$. In the example shown in FIG. 8, $N_T = 9$, of which 3 did not arrive at the far end (i.e., $N_M = 3$), such that $P_R = 9/(9-3) = 1.5$. That is, the maximum transmission rate of the NDC is 1.5 times that of the NTP, i.e., which resulted in the NTP only being able to transmit two packets for every three packets transmitted by NDC to the NTP after the NTP input buffer had been filled and the first packet of the series dropped. The ratio $P_R$ is used for rate limiting in the NDC for cases where the NTP (760) has a relatively lower maximum transmission rate and for estimating the propagation times of packets that are forwarded to the NTP (760).

The approximate input buffer size of the NTP (760) is equal to $N_R - (N_R/P_R)$ multiplied by the average packet size of the transmitted sequence. This equation can be derived by setting the approximate buffer size to be equal to the amount of data sent into the NTP before the buffer became full as indicated by the first missing packet (i.e., $N_R$ multiplied by the average packet size of the transmitted sequence) less the amount of data transmitted through the NTP during the period $T_R$ during which the buffer was filling (i.e., $T_R$ multiplied by the maximum transmission rate $R_{NTP}$ of the NTP). This yields the equation Bsize=$N_R$*AVG SIZE–$T_R$*$R_{NTP}$. The period $T_R$ can be found by multiplying the number of packets $N_R$ by the average packet size, to obtain the approximate amount of data sent by the NDC into the NTP during the period in which the buffer was filling, and dividing the result by the maximum transmission rate of the NDC, i.e., $T_R = N_R$*AVG SIZE/$R_{NDC}$. Allowances for other network parameters such as inter-packet delay may also be taken into account. Substituting the latter for $T_R$ in the above equation for the buffer size yields Bsize=$N_R$*AVG SIZE–($N_R$*AVG SIZE/$R_{NDC}$)*$R_{NTP}$, which becomes Bsize=$N_R$*AVG SIZE–($N_R$*AVG SIZE)/$P_R$ by substituting $P_R$ for $R_{NTP}/R_{NDC}$, which simplifies to Bsize=[$N_R$–($N_R/P_R$)]*AVG SIZE. For the example packet sequence depicted in FIG. 8, $N_R$ is equal to 4, the ratio $P_R$ is equal to 1.5, and the approximate input buffer size of the NTP (750) is equal to 1.333 multiplied by the average packet size of the transmitted sequence. The estimated ratio $P_R$ and the estimated buffer size are provided to the second NDC (740). Thus, given the results of a link bandwidth analyzer, a NDC is provided with estimated network parameters, that can be used for network delay control methods such as a rate-limiting type methods (such as those shown, for example and without limitation, in FIGS. 1-2C) or a NTP buffer management type methods (such as those shown, for example and without limitation, in FIGS. 3-4C).

Figure 9:
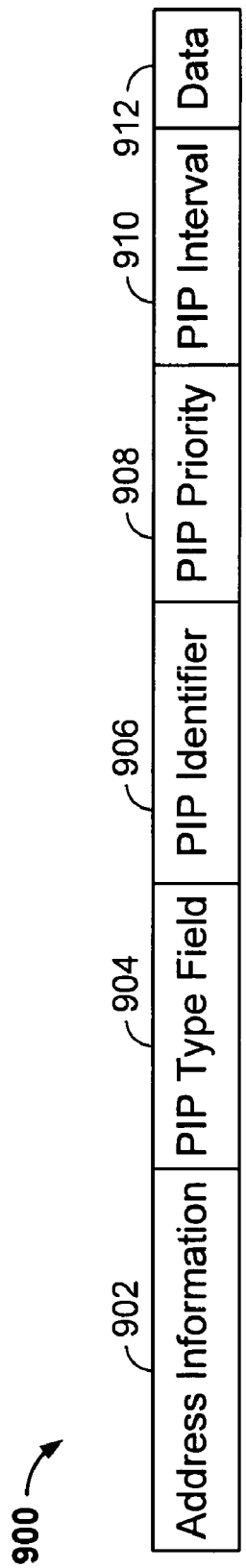
FIG. 9 shows an example format of a PIP data packet.

A general purpose and dynamic method of designating timing sensitive packets is provided through a packet interval protocol (PIP). Using a PIP, designated timing sensitive packets need not be periodic or defined prior to the deployment of a network that incorporates network delay control. An example format of a PIP data packet is shown in FIG. 9. The PIP packet format (900) shown in FIG. 9 includes an address information field (902), which may include identification data with respect to the destination and origin of the data packet. Also included in the PIP packet format (900) is a PIP type field (904) used to distinguish a PIP packet from other packets. A PIP identifier field (906) is used to distinguish PIP packets associated with a particular function or application from other PIP packets. The priority field (908) included in the PIP packet format (900) is used to prioritize the network delay control of various PIP packets. A packet interval field (910) indicates a period in time at which another PIP packet with the same PIP identifier will be transmitted. The data or payload of the packet may be included in the data field (912). In operation, the PIP fields will typically be managed such that, for example, the assignment of a PIP identifier associated with the packets of one application does not coincide with the PIP identifier of packets associated with another application on the same network. Preferably a minimum interval is specified in the PIP so that designated timing sensitive packets cannot consume an unacceptably large percentage of the available bandwidth for a given network path.

Various elements and embodiments can be combined and incorporated into network flow controllers, such as switches, hubs, routers and gateways, to provide a network of NDC's suitable for arbitrary and general purpose network applications. In general a NDC operates to ensure that after a first designated timing sensitive packet is detected, subsequent designated timing sensitive packets will not be substantially delayed by extraneous network traffic, which may otherwise be stored in and propagating through a port or network transmission path. Thus, an NDC provides a relatively small period of time through which timing sensitive packets can propagate unimpeded and with minimal and predictable propagation delays. Using a NDC, measured average delays and measured average jitter of timing sensitive packets through a network transmission path are substantially constant, even while extraneous network traffic varies from 0 percent to 100 percent of the series combination of a NDC and network transmission path transmission capacity.

Detecting and anticipating timing sensitive packets and consequently controlling the flow of packets to a NTP through the use of a timer has been disclosed. The output of packets from a network flow controller can be regulated and inactivated when the next designated timing sensitive packet is expected. For example, the normal mode timer may be set to expire slightly later than the expected arrival time of the next designated timing sensitive packet or may be used in conjunction with another timer, such as a quiet timer. In some embodiments, prior to the expiration of the normal mode timer or quiet timer, if used, any packets to be transmitted that are not designated timing sensitive packets are evaluated with respect to the status of a timer, the size of a packet to be transmitted and the estimated propagation time of the packet. Also, a NDC based on rate limiting may employ buffer utilization estimations to improve the efficiency or throughput of a corresponding NTP.

Although the foregoing embodiments have been described in some detail for purposes of clarity of understanding, the invention is not limited to the details provided. There are many alternative ways of implementing the invention. The disclosed embodiments are illustrative and not restrictive. Numerous alterations, modifications and substitutions will occur to one skilled in the art without departing from the scope of the invention as defined in the appended claims.

What is claimed is:

1. A method of controlling network traffic, comprising:
monitoring a plurality of packets to be transmitted via a network transmission path;
anticipating a time at which a timing sensitive packet will become available for transmission via the network transmission path; and
controlling the plurality of packets in accordance the anticipated time so that the network transmission path will not be occupied by packets other than the timing sensitive packet at a time associated with the anticipated time;
wherein controlling the flow of packets to the network transmission path comprises clearing a memory associated with the network transmission path prior to the anticipated time.

2. A method of controlling network traffic as in claim 1 further comprising rate limiting the plurality of packets to be transmitted in accordance with an optimal data rate of the network transmission path.

3. A method of controlling network traffic as recited in claim 1, wherein the timing sensitive packet comprises a timing packet.

4. A method of controlling network traffic as recited in claim 1, wherein the time associated with the anticipated time comprises a time window determined based on the anticipated time.

5. A method of controlling network traffic as recited in claim 1, wherein controlling the flow of packets to the network transmission path comprises clearing the memory associated with the network transmission path prior to the anticipated time so that the packet of a specific type is transmitted via the network transmission path without being buffered.

6. A method of controlling network traffic as recited in claim 1, wherein controlling the flow of packets to the network transmission path comprises keeping packets other than the timing sensitive packet from being transmitted during a time window associated with the anticipated time.

7. A method of controlling network traffic as recited in claim 6, wherein the time window is associated with a timer.

8. A method of controlling network traffic as recited in claim 6, wherein the beginning of the time window is associated with setting a timer.

9. A method of controlling network traffic as recited in claim 6, wherein the end of the time window is associated with the expiration of a timer.

10. A method of controlling network traffic as recited in claim 1, wherein controlling the flow of packets to the network transmission path comprises storing packets other than the timing sensitive packet in a memory.

11. A method of controlling network traffic as recited in claim 1, wherein controlling the flow of packets to the network transmission path comprises determining a bandwidth of the network transmission path.

12. A method of controlling network traffic as recited in claim 1, wherein controlling the flow of packets to the network transmission path comprises determining a bandwidth of the network transmission path and regulating the sending of data to the network transmission path so as to avoid significantly exceeding the network transmission path bandwidth.

13. A method of controlling network traffic as recited in claim 1, wherein controlling the flow of packets to the network transmission path comprises sending a plurality of test packets via the network transmission path.

14. A method of controlling network traffic as recited in claim 1, wherein controlling the flow of packets to the network transmission path comprises approximating a maximum data transmission rate associated with the network transmission path.

15. A method of controlling network traffic as recited in claim 14, wherein approximating a maximum data transmission rate associated with the network transmission path comprises:

sending a series of test packets at a known rate from a sending node to the network transmission path for transmission to a receiving node via the network transmission path;

determining how many of the packets comprising the series of test packets arrived at the receiving node; and approximating the maximum data transmission rate associated with the network transmission path based at least in part on data associated with the packets, if any, that did not arrive at the receiving node.

16. A method of controlling network traffic as recited in claim 15, wherein approximating the maximum data transmission rate associated with the network transmission path based at least in part on data associated with the packets, if any, that did not arrive at the receiving node comprises approximating the maximum data transmission rate associated with the network transmission path based at least in part on the number of packets that did not arrive.

17. A method of controlling network traffic as recited in claim 15, wherein approximating the maximum data transmission rate associated with the network transmission path based at least in part on data associated with the packets, if any, that did not arrive at the receiving node comprises approximating the maximum data transmission rate associated with the network transmission path based at least in part on an identifier associated with a packet that did not arrive.

18. A method of controlling network traffic as recited in claim 15, wherein approximating the maximum data transmission rate associated with the network transmission path based at least in part on data associated with the packets, if any, that did not arrive at the receiving node comprises:

identifying a first missing packet in the series as received at the receiving node;

determining the number of packets in a subset that includes the first missing packet and the packets of the series that follow the first missing packet in order; and comparing the total number of packets in the subset to the number of packets in the subset that arrived at the receiving node.

19. A method of controlling network traffic as recited in claim 18, wherein approximating the maximum data transmission rate associated with the network transmission path based at least in part on data associated with the packets, if any, that did not arrive at the receiving node further comprises dividing the number of packets in the subset that arrived at the receiving node by the total number of packets in the subset and multiplying the result by the known rate.

20. A method of controlling network traffic as recited in claim 15, wherein the known rate comprises a maximum data transmission rate associated with the sending node.

21. A method of controlling network traffic as recited in claim 15, wherein it is determined that the maximum data transmission rate associated with the network transmission path equals or exceeds the known rate.

22. A method of controlling network traffic as recited in claim 1, wherein controlling the flow of packets to the network transmission path comprises determining a buffer size of a buffer associated with the network transmission path.

23. A method of controlling network traffic as recited in claim 22, wherein determining a buffer size comprises:

sending a series of test packets at a known rate from a sending node to the network transmission path for transmission to a receiving node via the network transmission path;

determining whether all of the packets comprising the series of test packets arrived at the receiving node; and in the event it is determined that not all of the packets comprising the series arrived at the receiving node:

identifying a first missing packet in the series that did not arrive;

determining how many packets precede the first missing packet in the series; and approximating the buffer size based at least in part on how many packets precede the first missing packet in the series.

24. A method of controlling network traffic as recited in claim 23, wherein approximating the buffer size further comprises approximating the buffer size based at least in part on a maximum data transmission rate associated with the network transmission path.

25. A method of controlling network traffic as recited in claim 23, wherein approximating the buffer size further comprises approximating the buffer size based at least in part on an average packet size associated with the series.

26. A method of controlling network traffic as recited in claim 23, wherein approximating the buffer size based at least in part on how many packets precede the first missing packet in the series comprises subtracting from an amount of data associated with the packets that precede the first missing packet in the series the approximate amount of data transmitted by the network transmission path to the receiving node during a period in which the packets that precede the first missing packet in the series were sent.

27. A method of controlling network traffic as recited in claim 1, wherein controlling the flow of packets to the network transmission path comprises determining a buffer size of a buffer associated with the network transmission path and setting a time window based at least in part on the buffer size.

28. A method of controlling network traffic as recited in claim 1, wherein controlling the flow of packets to the network transmission path comprises determining a buffer size of a buffer associated with the network transmission path and dynamically adjusting a time window based on incoming packet length and amount of data currently in the buffer.

29. A method of controlling network traffic as recited in claim 1, wherein controlling the flow of packets to the network transmission path comprises approximating on a running basis the amount of data occupying the network transmission path at any given time.

30. A method of controlling network traffic as recited in claim 29, wherein approximating on a running basis the amount of data occupying the network transmission path at any given time comprises incrementing a propagation timer each time a packet is sent to the network transmission path and decrementing the propagation timer over time based on a data transmission rate associated with the network transmission path.

31. A method of controlling network traffic as recited in claim 29, wherein controlling the flow of packets to the network transmission path further comprises preventing a non-timing sensitive packet from being sent if adding the non-timing sensitive packet to the data occupying the network transmission path would result in the capacity of a buffer size associated with a buffer associated with the network transmission path being exceeded.

32. A method of controlling network traffic as recited in claim 31, wherein controlling the flow of packets to the network transmission path further comprises preventing a non-timing sensitive packet from being sent if adding the non-timing sensitive packet to the data occupying the network transmission path would result in the network transmission path not being available to transmit the timing sensitive packet with a substantially minimum delay at a time associated with the anticipated time.

33. A method of controlling network traffic as recited in claim 29, wherein controlling the flow of packets to the network transmission path further comprises preventing a non-timing sensitive packet from being sent if adding the non-timing sensitive packet to the data occupying the network transmission path would result in the network transmission path not being available to transmit the timing sensitive packet with a substantially minimum delay at a time associated with the anticipated time.

34. A method of controlling network traffic as recited in claim 1, wherein the timing sensitive packet comprises a field indicating a time at which a next timing sensitive packet will become available.

35. A method of controlling network traffic as recited in claim 1, wherein the timing sensitive packet comprises a field used to distinguish the timing sensitive packet from non timing sensitive packets.

36. A method of controlling network traffic as recited in claim 1, wherein the timing sensitive packet is associated with a particular function and comprises a field used to distinguish the timing sensitive packet from timing sensitive packets not associated with said function.

37. A method of controlling network traffic as recited in claim 1, wherein the timing sensitive packet comprises a field indicating a priority associated with the timing sensitive packet.

38. A method of controlling network traffic as recited in claim 1, wherein the timing sensitive packet comprises synchronization information.

39. A method of controlling network traffic as recited in claim 1, wherein the timing sensitive packet comprises frequency information used to frequency lock a receiving node.

40. A method of controlling network traffic as recited in claim 1, wherein the timing sensitive packet comprises a wireless protocol packet.

41. A method of controlling network traffic as recited in claim 1, wherein the timing sensitive packet comprises voice data.

42. A method of controlling network traffic as recited in claim 1, wherein the timing sensitive packet comprises streamed video data.

43. A method of controlling network traffic comprising:
monitoring a plurality of packets to be transmitted via a network transmission path;
anticipating a time at which a timing sensitive packet will become available for transmission via the network transmission path; and
controlling the plurality of packets in accordance the anticipated time so that the network transmission path will not be occupied by packets other than the timing sensitive packet at a time associated with the anticipated time;
wherein the time associated with the anticipated time comprises a time window determined based on the anticipated time and further comprising extending the time window in the event the timing sensitive packet does not arrive at the anticipated time.

44. A system for controlling network traffic, comprising:
an interface for transmitting a plurality of packets via a network transmission path; and
a network delay controller coupled to the interface, configured to:
monitor a plurality of packets to be transmitted via a network transmission path;
anticipate a time at which a timing sensitive packet will become available for transmission via the network transmission path; and
control a flow of packets to the network transmission path in light of the anticipated time so that the network transmission path will not be occupied by packets other than the timing sensitive packet at a time associated with the anticipated time, at least in part by clearing a memory associated with the network transmission path prior to the anticipated time.

45. A system for controlling network traffic as recited in claim 44, wherein the processor is further configured to rate limit the plurality of packets to be transmitted in accordance with an optimal data rate of the network transmission path.

46. A system for controlling network traffic as recited in claim 44, wherein the timing sensitive packet comprises a timing packet.

47. A system for controlling network traffic as recited in claim 44, wherein the time associated with the anticipated time comprises a time window determined based on the anticipated time.

48. A system for controlling network traffic as recited in claim 44, wherein the processor is configured to control the flow of packets to the network transmission path at least in part by keeping packets other than the timing sensitive packet from being transmitted during a time window associated with the anticipated time.

49. A computer readable storage medium storing computer-executable program instructions for:
monitoring a plurality of packets to be transmitted via a network transmission path;
anticipating a time at which a timing sensitive packet will become available for transmission via the network transmission path; and
controlling a flow of packets to the network transmission path in light of the anticipated time so that the network transmission path will not be occupied by packets other than the timing sensitive packet at a time associated with the anticipated time;
wherein controlling the flow of packets to the network transmission path comprises clearing a memory associated with the network transmission path prior to the anticipated time.

50. A system for controlling network traffic, comprising:
an interface for transmitting a plurality of packets via a network transmission path; and
a network delay controller coupled to the interface, configured to:
monitor a plurality of packets to be transmitted via a network transmission path;
anticipate a time at which a timing sensitive packet will become available for transmission via the network transmission path; and
control a flow of packets to the network transmission path in light of the anticipated time so that the network transmission path will not be occupied by packets other than the timing sensitive packet at a time associated with the anticipated time
wherein the time associated with the anticipated time comprises a time window determined based on the anticipated time and the processor is further configured to extend the time window in the event the timing sensitive packet does not arrive at the anticipated time.

51. A computer readable storage medium storing computer-executable program instructions for:

monitoring a plurality of packets to be transmitted via a network transmission path;

anticipating a time at which a timing sensitive packet will become available for transmission via the network transmission path; and controlling a flow of packets to the network transmission path in light of the anticipated time so that the network transmission path will not be occupied by packets other than the timing sensitive packet at a time associated with the anticipated time;

wherein the time associated with the anticipated time comprises a time window determined based on the anticipated time and further comprising computer instructions for extending the time window in the event the timing sensitive packet does not arrive at the anticipated time.

* * * * *